United States Patent Office 3,089,877
Patented May 14, 1963

3,089,877
PROCESS FOR THE PRODUCTION OF IRIDOMYR-
MECIN AND RELATED COMPOUNDS
Friedrich W. A. G. K. Korte, Godesberg, and Albrecht
K. W. Zschocke, Cologne, Germany, assignors to Shell
Oil Company, a corporation of Delaware
No Drawing. Filed Oct. 28, 1959, Ser. No. 849,187
Claims priority, application Germany Oct. 29, 1958
4 Claims. (Cl. 260—343.2)

The present invention relates to a process for the production of bicyclic lactones, insecticidal compositions containing these lactones, and employment of these compounds as insecticides. More specifically, the present invention relates to the preparation and insecticidal use of bicyclic ring lactones which are substituted by alkyl groups, preferably in the alpha position to the carbonyl group, the ring system condensed to the lactone group being a non-aromatic substituted or unsubstituted six-membered or five-membered ring. The present invention also contemplates novel intermediates employed in the production of these bicyclic lactones.

Research carried out by N. Pavan has led to the discovery of a novel natural substance having highly insecticidal properties. This substance, termed iridomyrmecin, is to be regarded as a bicyclic lactone and has the structure represented by the following formula:

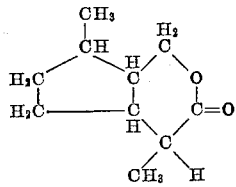

This structure has been ascertained by R. Fusco and co-workers in La Chimica e l'Industria 37, No. 4 (April 1955). The substance could hitherto only be prepared by means of the process of extracting the *Iridomyrmex humilis* Mayr ant's venom.

This extraction process has not, however, achieved any practical significance since *Iridomyrmex humilis* contains only a very small quantity of the venom and the collection or breeding of the insects is attended with considerable difficulty. It has now been found that not only this substance but also a series of other bicyclic lactones have an insecticidal effect and that such substances may also be obtained synthetically in good yields.

According to the invention, bicyclic lactones having insecticidal properties in particular are produced by subjecting to the Diels-Alder addition reaction alpha,beta-unsaturated carbocyclic aldehydes or ketones with vinyl ethers having the general formula

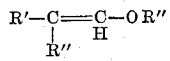

in which R' and/or R'' represent hydrogen or alkyl groups, and R''' an alkyl group, after which the resultant cyclic adducts are hydrogenated and finally oxidized to lactones.

The alpha,beta-unsaturated carbocyclic aldehydes or ketones are preferably those having not more than six carbon atoms in the ring member. Five- and six-membered rings are most preferred. These ring members may be substituted or unsubstituted with alkyl, aryl, aralkyl and alkaryl groups. Of the substituents on the five- or six-membered ring alkyl groups of one to seven carbon atoms are most preferred. Specific examples include methyl, ethyl, isopropyl, isobutyl and isovaleryl groups. Preferred aldehydes or ketones are cyclohexene-1-aldehyde, cyclopentene-1-aldehyde, alkyl (e.g., 4- or 5-methyl)cyclopentene-1-aldehyde and the ketones which correspond to these compounds and in addition have attached to the ketone group a lower alkyl group, e.g., the methyl, ethyl, propyl, isopropyl, etc., group.

In the unsaturated ether, R' and/or R'' represent hydrogen or alkyl groups, and R''' is an alkyl group. The alkyl groups have, for example, from one to seven carbon atoms, such as the methyl, ethyl, isopropyl, isobutyl or isovaleryl group.

Examples of preferred compounds are methylvinyl ether, ethylvinyl ether and butylvinyl ether.

The separate stages of the process for the production of the bicyclic lactones are shown, for example, by the following reaction scheme in which the unsaturated aldehyde, 5-methyl-cyclopentene-1-aldehyde, reacts as a diene and the 2-methylvinylmethyl ether is to be regarded as a dienophile.

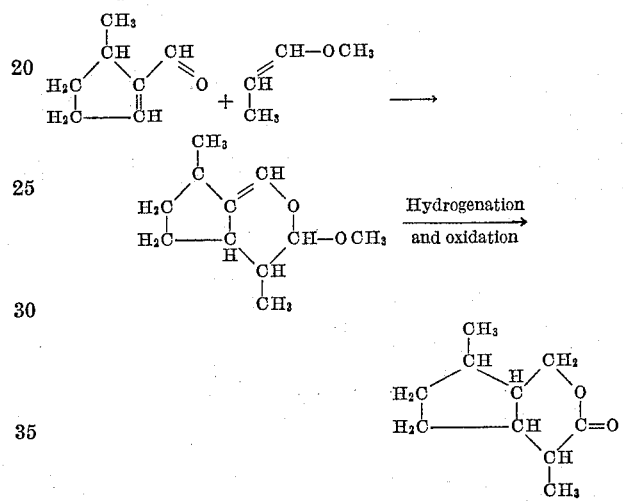

The Diels-Alder addition reaction may be carried out at room temperature but is preferably carried out in an autoclave above room temperature. A temperature of approximately 160° C. is preferred. Superatmospheric pressure is preferred to atmospheric pressure.

The hydrogenation stage is carried out in the conventional manner in an alcoholic medium with hydrogen in the presence of a hydrogenation catalyst such as nickel, copper, finely divided platinum or palladium, molybdenum and tungsten sulfides or copper and chromium oxides. Raney nickel is preferred in the autoclave at elevated temperature and pressure.

The oxidation is carried out employing any conventional oxidation methods, for example, if desired, the oxidation step may be carried out in a slightly acidified medium employing hydrogen peroxide. Other oxidation agents which may be effectively employed for the purposes of the present invention will be apparent to those well versed in the art.

The present invention also encompasses novel intermediates having the following structural formula

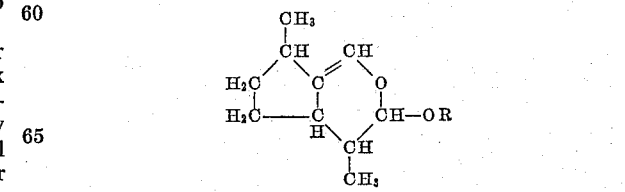

wherein R is hydrogen, alkyl, aryl, aralkyl or an alkaryl group. R may be substituted or unsubstituted with other groups and is preferably an alkyl group of 1–5 carbon atoms such as methyl, ethyl or pentyl.

EXAMPLE I

Production of the Lactone of (2-Hydroxymethyl-1-Cyclopentyl)-Acetic Acid Having the Formula

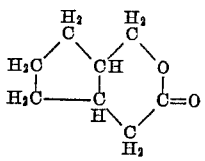

Sixty-three grams of methylvinyl ether (condensed in methanol/$CO_2$), 80 grams of cyclopentene-1-aldehyde and 0.2 gram of hydroquinone were kept in an autoclave at 160° C. for 14 hours. Filler gas: nitrogen. The blackish brown liquid was distilled in a column in vacuo and an unsaturated methyl ether having the formula:

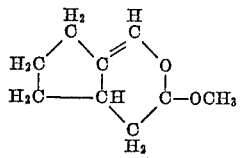

was obtained in a yield of 54% of theory. Sixteen grams of this ether were hydrogenated in 300 cc. of absolute alcohol with 10 grams of Raney nickel for 3 hours in the autoclave at 125° C. and 85 mm. Hg. The fractionation yielded the corresponding methyl ether in a yield of 58% of theory Seven grams of this saturated methyl ether were stirred with 10 cc. of 2 $NH_2SO_4$ and 5 cc. of $H_2O$ for six hours at 50° C. The mixture was then neutralized with $NaHCO_3$ to a pH of 6. After stirring overnight, 12 cc. of 15% $H_2O_2$ were added and the solution was kept for 4 hours at 50° C. After extraction with ether and drying of the ether over $Na_2SO_4$, the lactone of the above-described formula is obtained on fractionation in a yield of 28% of theory.

EXAMPLE II

Production of an Isomer Mixture of the Lactone of Alpha-(2-Hydroxymethyl-(4 and 5) Monomethylcyclopentyl) Propionic Acid Having the Formula

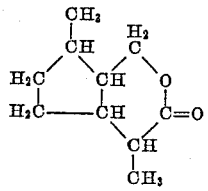

and

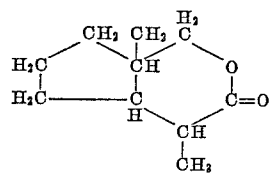

For the production of such an isomer mixture, the starting material used was a mixture of 4-methylcyclopentene-1-aldehyde and 5-methylcyclopentene-1-aldehyde prepared in the following way:

One hundred fifty grams of $NaIO_4$ were suspended in 1.8 liters of water while stirring, after which 35 cc. of concentrated nitric acid were added and stirred until it dissolved. The solution was brought to a pH of 4 with an aqueous caustic soda solution. Eighty grams of 1-methylcyclohexane-3,4-diol were then added. The temperature rose from 18° to 30° C. The solution was stirred for 20 minutes and cooled to 25° C. Two hundred fifty cc. of ether were then added together with 210 cc. of a 20% KOH solution. The whole was stirred vigorously for a further 30 minutes, the ether layer separated, the aqueous phase shaken five times with 200 cc. of ether and the combined extracts were dried over sodium sulfate. After the ether was distilled off, fractionation in vacuo was carried out, a methylcyclopentene-1-aldehyde being obtained in a yield of 60% of theory.

The resultant mixture of cyclic aldehydes was subjected to the Diels-Alder addition reaction with 1-methylvinylmethyl ether in exactly the same manner as in Example I, after which the resultant cyclic adduct was hydrogenated and finally oxidized to the desired lactone mixture.

EXAMPLE III

Production of the Lactone of Alpha-(2-Hydroxymethyl-1-Cyclohexyl)Propionic Acid Having the Formula

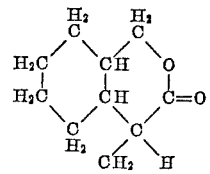

In the same manner as described in Example I for the production of the compound described therein, this bicyclic lactone was produced by the Diels-Alder addition reaction of 5-methylcyclohexene-1-aldehyde with 1-methylvinylmethyl ether and subsequent hydrogenation and oxidation of the resultant adduct.

The substances produced according to the invention are compounds which have a surprising insecticidal effect. The biocidal effect is a rapid one, and in this respect the substances differ essentially from the known chlorine-containing insecticides. Another important advantage of the new lactones is that they are relatively non-toxic to warm-blooded animals. Hence, they are very suitable as insecticides or as active agents in insecticidal compositions.

In order to give an idea of the insecticidal effect of the lactones, the results of a number of experiments with locusts, flour beetles and cockroaches are listed in the following table.

In order to test this effect five insects were subjected to an experiment with a solution of the substance to be tested. The substance to be tested was absorbed in the form of 1 cc. of a solution on a disc of filter paper having a diameter of 9 cm., and the mortality of the insects determined after 24 hours. In the table, A denotes a complete kill, B a partial kill, and C no kill.

| Lactone according to— | Insect | | |
| --- | --- | --- | --- |
| | Schistocerca gregaria (locust) | Tribolium confusum (confused flour beetle) | Blattella germanica (cockroach) |
| Example II | B | B | B |
| Example III | A | C | A |

The compounds of this invention can be employed for insecticidal purposes by the use of any of the methods which are conventionally employed in the art. For example, the compounds can either be sprayed or otherwise applied in the form of a solution or dispersion, or they can be absorbed on an inert, finely divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or more preferably, they can be dispersed or emulsified in water and the resulting aqueous dispersion or emulsion applied as a spray. Solid carrier materials which can be employed include talc, bentonite, lime, gysum, pyrophyllite, and similar inert solid diluents. If desired, the compounds of the present invention can be employed as aerosols, as by dispersing the same into the atmosphere by means of a compressed gas.

The concentration of the compounds to be used with the above carriers is dependent upon many factors, including the particular compound utilized, the carrier employed, the method and conditions of application, and the insect species to be controlled, a proper consideration and resolution of these factors being within the skill of those versed in the insecticide art. In general, however, the compounds of this invention are effective in concentrations of from about 0.01 to 0.5% based upon the total weight of the composition, though under some circumstances as little as about 0.00001% or as much as 2% or even more of the compound can be employed with good results from an insecticidal standpoint.

When employed as an insecticide, a compound of this invention can be employed either as the sole toxic ingredient of the insecticidal composition, or it can be employed in conjunction with the other insecticidally active materials. Representative insecticides of this latter class include the naturally occurring insecticides such as pyrethrum, rotenone, sabadilla, and the like, as well as various synthetic insecticides, including DDT, benzene hexachloride, thiodiphenylamine, cyanides, tetraethyl pyrophosphate, diethyl-p-nitro-phenyl thiophosphate, azobenzene, and the various compounds of arsenic, lead and/or fluorine.

We claim as our invention:

1. A process for the production of a bicyclic lactone of formula

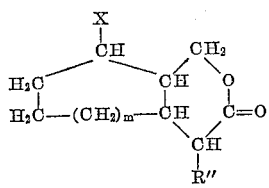

which comprises condensing an alpha-beta-unsaturated aldehyde of formula

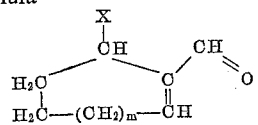

with a vinyl ether of formula

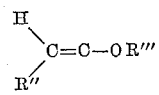

at from room temperature to about 160° C. and under atmospheric to superatmospheric pressure to obtain a cyclic adduct of formula

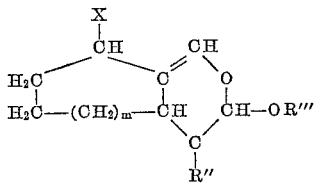

wherein X and R'' are each a member selected from the group consisting of hydrogen and alkyl of one to seven carbon atoms, R''' is alkyl of one to seven carbon atoms and $m$ is a whole positive number from 0 to 1, inclusive, hydrogenating the cyclic adduct with hydrogen in the presence of a hydrogenation catalyst selected from the group consisting of nickel, copper, platinum, palladium molybdenum sulfide, tungsten sulfide, copper oxide, chromium oxide and oxidizing the hydrogenated cyclic adduct with hydrogen peroxide.

2. A process for the production of a bicyclic lactone of claim 1, in which X, R'' and R''' are each alkyl of of one to seven carbon atoms and $m$ is 0.

3. A process for the production of a bicyclic lactone of claim 1, in which X, R'' and R''' are each alkyl of one to seven carbon atoms and $m$ is 1.

4. A process for the production of a bicyclic lactone of claim 1, in which X, R'' and R''' are each methyl and $m$ is 0.

References Cited in the file of this patent
UNITED STATES PATENTS

| | | |
|---|---|---|
| 1,995,247 | Haring | May 19, 1935 |
| 2,542,965 | Levesque | Feb. 20, 1951 |
| 2,701,254 | Hopff et al. | Feb. 1, 1955 |

OTHER REFERENCES

Pavan: Chemical Abstracts, volume 48, page 896e (1954).